May 12, 1942.    W. H. STEWART    2,282,618
FISHING ROD
Filed April 5, 1941
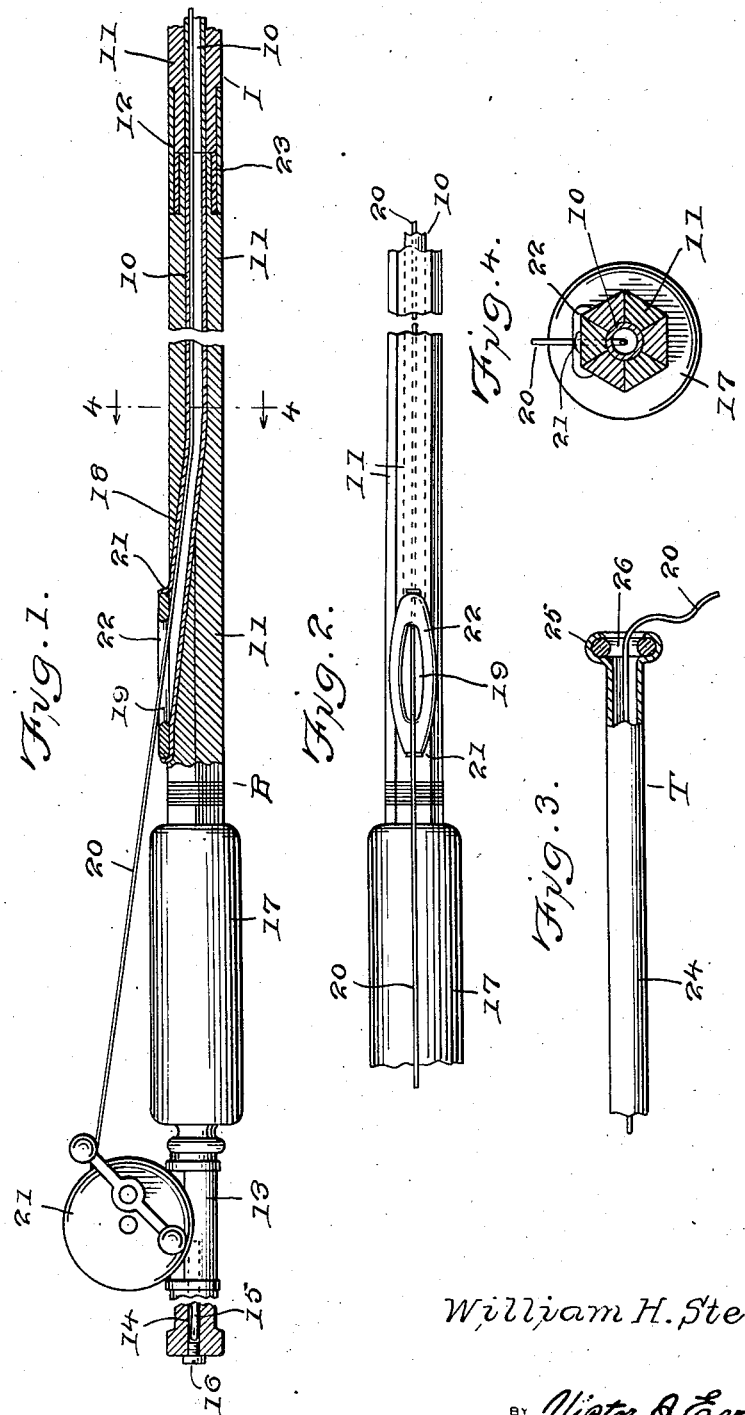
William H. Stewart
INVENTOR
BY Victor J. Evans & Co.
ATTORNEYS Patented May 12, 1942

2,282,618

UNITED STATES PATENT OFFICE 2,282,618

FISHING ROD

William H. Stewart, East Jaffrey, N. H.

Application April 5, 1941, Serial No. 387,091

2 Claims. (Cl. 43—18)

The present invention relates to improvements in fishing rod construction and has for its primary object the provision of a fishing rod of generally improved design.

Another object of the invention is to provide a fishing rod constructed so that the line is protected against snagging and entanglement throughout the length of the rod.

A further object of the invention is to provide a fishing rod having an axial guide bore designed so that the line may be run therethrough with a minimum of frictional contact.

Still another object of the invention is the provision of a fishing rod embodying an axially disposed tube having a body covering assembled thereon.

A still further object of the invention is to provide a fishing rod of the aforesaid character which is relatively simple and durable in construction and highly efficient in use.

Other objects and advantages of the invention will become apparent as the description progresses.

In the accompanying drawing forming a part of this specification and in which like numerals are employed to designate corresponding parts throughout:

Figure 1 is a fragmentary view of the improved rod partly in side elevation and partly in longitudinal section, Figure 2 is a fragmentary top plan view of the same, Figure 3 is a fragmentary side elevational view of the tip section of the rod partly in section, and Figure 4 is an enlarged transverse section taken on line 4—4 of Figure 1.

Referring to the drawing, wherein for the purpose of illustration is shown a preferred example of the invention, the rod is preferably composed of a butt section B, one or more intermediate sections I and a tip section T. The butt and intermediate sections are formed by assembly, about a tube 10, of plurality of longitudinally directed body forming sections 11. The axially disposed tube 10 is preferably formed of resilient flexible material such as spring metal while the exterior body sections 11 may be formed of suitably flexible material such as bamboo or wood, these sections being sector shaped in cross section and may be six in number to form a hexagonal exterior contour as shown at Figure 4.

In the structure of the intermediate sections the center tube 10 may advantageously be of uniform diameter throughout its length and corresponds to the length of the body strips 11. At one end such an intermediate section is preferably provided with a portion of exteriorly reduced diameter designed to receive thereon part of a ferrule or bushing 12 which is approximately flush with the smallest exterior dimension of the body portion.

The butt section B of the rod is formed so that the interior tube section 10 is disposed axially within the body strips from the forward end to a point short of the rear end, as clearly illustrated at Figure 1. On the rear portion of this section is provided a reel seat 13 preferably formed with a longitudinally extending bore 14 providing a housing for a needle 15 and normally closed by a screw plug 16. Forwardly of the reel seat portion 13 of this section is formed an enlarged grip 17 of cork or other preferred material. A feature of the butt section construction resides in the provision of a lead tube 18, the forward end of which joins the axial tube 11. This lead tube is disposed so that it assumes a slight gradual inclination rearwardly from its juncture with the axial tube to a feed opening 19 at the top surface of the rod body forwardly of the grip portion 17. As shown to advantage at Figure 1 the gradually inclined tube section 18 is arranged so that the fishing line, indicated at 20, extends in an approximately straight line from its winding on a reel 21 to the point of juncture of the tube sections 10 and 18, when the line is taut, so as to reduce to the utmost contact or friction of the line with the guide tube structure. At the outlet forming end of the tube section 18 is formed a pair of longitudinally opposed projections or lugs 21 designed to firmly grip the opposed end portions of an elongated guide ring 22 preferably formed of wear resisting material such as agate and conforming to the elongated formation of the beveled outlet of the tube. The forward end portion of the butt section B is of substantially reduced diameter to accommodate thereon a relatively short ferrule 23 tightly fitted thereon and slidably engageable with the protruding portion of the ferrule 12 secured on the adjacent intermediate rod section I for slidable connection of these rod sections.

The tip section T of the rod is preferably formed of spring metal tubing 24 having its inner or rear end formed to slidably connect with the outmost intermediate section in any preferred known manner and having its outer or forward end shaped to provide an enlarged annular neck 25 curved in cross section to form an internal groove. In the groove of the neck 25 is tightly fitted a lining ring 26 of wear resisting and antifriction material, such as agate.

When the respective sections of the rod are assembled at the slidably connected joints the complementary tube sections 10 thereof provide a continuous line guiding bore of approximately uniform diameter from the butt to the tip. The slight inclination of the slanted bore section 18 relative to the axial sections avoids the formation of an abrupt angle in the bore while the elimination of the exterior guide eyes provides a relatively smooth exterior surface. The fishing line may be conveniently conducted through the bore of the assembled rod by attaching, to the outer end thereof, the needle 15 and disposing the rod butt end upward so that the needle will be fed through the opening 19 and drop through the bore and carry the line therewith.

Thus, my improved rod construction provides a strong and suitably flexible rod which affords effective means for extending the line through a bore therein to protect the line against entanglement while eliminating objectionable exterior projections. The particular bore structure is formed to obviate abrupt angles and otherwise minimize frictional contact of the line with the bore so that the line is freely movable therethrough under all fishing conditions regardless of the tension to which it is subjected.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a fishing rod having a grip portion at the rear thereof and a reel mounting on an extension at the rear portion thereof, the major length of the said rod having a bore defining tube extending axially therethrough, an angularly directed bore defining tube connecting with the inner end of the axial tube, the said angular tube extending rearwardly and outwardly of the rod from the axial tube at a very gradual inclination to the axis of the rod and making a wide angle with the axial tube, the said angular bore forming tube providing a longitudinally elongated feed opening at one side of the rod forward of the grip portion, an elongated guide ring of elliptical configuration of wear resisting material mounted on the side of the rod about the line feed opening, and a pair of longitudinally spaced lugs attached to the exterior of the rod releasably engaging the ends of the guide ring for holding the same in line guiding position.

2. In a fishing rod, a bore defining tube extended through the major length thereof, an obliquely directed bore defining tube connected with the inner end of the said axial tube and extending rearwardly therefrom at a very gradual inclination to the axis of the rod to the exterior thereof, the said oblique tube making a wide angle with the axial tube and providing a longitudinally elongated feed opening at one side of the rod, an elongated guide ring secured on the side of the rod about the edge of the feed opening and raised above the surface of the rod.

WILLIAM H. STEWART.